United States Patent
Brown et al.

(10) Patent No.: US 10,351,742 B2
(45) Date of Patent: Jul. 16, 2019

(54) SILICONE PRESSURE SENSITIVE ADHESIVES

(71) Applicant: Dow Corning Corporation, Midland, MI (US)

(72) Inventors: Janelle L. Brown, Beaverton, MI (US); Julie Lyn Cook, Turner, MI (US); Leon Neal Cook, Midland, MI (US); Elizabeth Kelley, Hope, MI (US); Timothy Paul Mitchell, Clio, MI (US); Lori Jean Sutton, Saginaw, MI (US); Stephanie Thompson, Boyne City, MI (US)

(73) Assignee: DOW SILICONES CORPORATION, Midland, MI (US)

(*) Notice: Subject to any disclaimer, the term of this patent is extended or adjusted under 35 U.S.C. 154(b) by 8 days.

(21) Appl. No.: 15/543,060

(22) PCT Filed: Jan. 19, 2016

(86) PCT No.: PCT/US2016/013839
§ 371 (c)(1),
(2) Date: Jul. 12, 2017

(87) PCT Pub. No.: WO2016/118472
PCT Pub. Date: Jul. 28, 2016

(65) Prior Publication Data
US 2018/0044566 A1    Feb. 15, 2018

Related U.S. Application Data

(60) Provisional application No. 62/105,307, filed on Jan. 20, 2015.

(51) Int. Cl.
| | | |
|---|---|---|
| *C09J 183/06* | (2006.01) | |
| *C09J 183/04* | (2006.01) | |
| *C09J 183/08* | (2006.01) | |
| *C08L 83/00* | (2006.01) | |
| *C08G 77/00* | (2006.01) | |
| *C08G 77/04* | (2006.01) | |
| *C08G 77/16* | (2006.01) | |
| *C08G 77/20* | (2006.01) | |

(52) U.S. Cl.
CPC ............. *C09J 183/06* (2013.01); *C08L 83/00* (2013.01); *C09J 183/04* (2013.01); *C09J 183/08* (2013.01); *C08G 77/04* (2013.01); *C08G 77/16* (2013.01); *C08G 77/20* (2013.01); *C08G 77/70* (2013.01)

(58) Field of Classification Search
CPC ............................. C09J 183/06; C08G 77/70
See application file for complete search history.

(56) References Cited

U.S. PATENT DOCUMENTS

| | | | |
|---|---|---|---|
| 3,159,601 | A | 12/1964 | Ashby |
| 3,220,972 | A | 11/1965 | Lamoreaux |
| 3,296,291 | A | 1/1967 | Chalk et al. |
| 3,419,593 | A | 12/1968 | Willing |
| 3,516,946 | A | 6/1970 | Modic |
| 3,814,730 | A | 6/1974 | Karstedt |
| 3,928,629 | A | 12/1975 | Chandra et al. |
| 3,989,668 | A | 11/1976 | Lee et al. |
| 5,036,117 | A | 7/1991 | Chung et al. |
| 5,041,586 | A | 8/1991 | Beck et al. |
| 5,175,325 | A | 12/1992 | Brown et al. |
| 5,319,040 | A | 6/1994 | Wengrovius et al. |
| 5,324,806 | A | 6/1994 | Wengrovius et al. |
| 5,357,007 | A | 10/1994 | Wengrovius et al. |
| 5,726,256 | A | 3/1998 | Benson et al. |
| 5,861,472 | A | 1/1999 | Cifuentes et al. |
| 6,387,487 | B1 * | 5/2002 | Greenberg ............. C09J 183/04 428/355 R |
| 6,605,734 | B2 | 8/2003 | Roy et al. |
| 8,017,712 | B2 * | 9/2011 | Berry ..................... C08G 77/32 264/176.1 |

FOREIGN PATENT DOCUMENTS

WO    WO2007067332 A2    6/2007

OTHER PUBLICATIONS

PCT/US2016/013839 International Search Report dated Apr. 21, 2016, 3 pages.

* cited by examiner

*Primary Examiner* — Robert D. Harlan
(74) *Attorney, Agent, or Firm* — Warner Norcross & Judd LLP

(57) ABSTRACT

The invention provides a process for the production of a pressure sensitive adhesive, comprising dissolving a particulate solid MQ silicone resin having a bulk density in the range 0.4-0.9 g/cm$^3$ in a volatile solvent, and dissolving a polydiorganosiloxane having a viscosity of 0.1 to 40,000 Pa·s at 25° C. in the volatile solvent before, simultaneously with or after dissolving the solid MQ silicone resin. The process of the present invention allows the production of a pressure sensitive adhesive in a solvent different from the solvent in which the MQ silicone resin was prepared.

17 Claims, No Drawings

SILICONE PRESSURE SENSITIVE ADHESIVES

CROSS-REFERENCE TO RELATED APPLICATIONS

This application is the National Stage of International Application No. PCT/US2016/013839 filed on 19 Jan. 2016, which claims priority to and all advantages of U.S. Appl. No. 62/105,307 filed on 20 Jan. 2015, the content of which is hereby incorporated by reference.

FIELD OF THE INVENTION

This invention relates to silicone pressure sensitive adhesives and to their production.

BACKGROUND OF THE INVENTION

Many silicone pressure sensitive adhesives are produced by mixing a solution of a branched silicone resin, specifically an MQ silicone resin with a polydiorganosiloxane and optionally a catalyst for condensation of the polydiorganosiloxane with the MQ silicone resin and/or a crosslinking agent for the polydiorganosiloxane.

By a 'MQ silicone resin' we mean a polymer comprised primarily of $R_3SiO_{1/2}$ and $SiO_{4/2}$ units (the M and Q units, respectively) wherein R is a functional or non-functional, substituted or unsubstituted monovalent radical. The MQ silicone resin may also include a limited number of $R_2SiO_{2/2}$ and $RSiO_{3/2}$ units, respectively referred to as D and T units. As used herein, the term "MQ silicone resin" means that, on average, no more than about 20 mole percent of the resin molecules are comprised of D and T units.

A siloxane is a compound which contains at least one Si—O bond. A polysiloxane is a compound containing several Si—O—Si— bonds forming a polymeric chain, where the repeating unit is —(Si—O)—. An organopolysiloxane is sometimes called a silicone. An organopolysiloxane contains repeating —(Si—O)— units where at least one Si atom bears at least one organic group. "Organic" means containing at least one carbon atom. An organic group is a chemical group comprising at least one carbon atom. A "silicone resin" or "resin" is a silicone comprising T and/or Q units.

MQ silicone resins are generally prepared in solution in an aromatic hydrocarbon solvent such as xylene or toluene, and are usually sold as solutions in the aromatic hydrocarbon solvent in which they were prepared. Thus silicone pressure sensitive adhesives are produced by dissolving a polydiorganosiloxane in a solution of a MQ silicone resin in an aromatic hydrocarbon solvent.

For some uses the solvent in which the MQ silicone resin was prepared is not a suitable vehicle for a pressure sensitive adhesive for that particular use. The process of the present invention allows the production of a pressure sensitive adhesive in a solvent different from the solvent in which the MQ silicone resin was prepared.

U.S. Pat. No. 5,726,256 describes producing a pressure sensitive adhesive by mixing a solution of a MQ silicone resin with a polydiorganosiloxane and an acid catalyst and reacting the MQ silicone resin with the polydiorganosiloxane. Reaction of polydiorganosiloxane with MQ silicone resin is typically called "bodying." U.S. Pat. No. 5,861,472 describes producing a 'bodied' pressure sensitive adhesive from a solution of a MQ silicone resin, a polydiorganosiloxane and a base catalyst. WO2007/067332 describes a continuous method for preparing a pressure sensitive adhesive by mixing a hydroxyl-functional polydiorganosiloxane polymer, a hydroxyl-functional polyorganosiloxane resin and a solvent while heating the composition at a temperature above the vaporization point of the solvent and removing volatile species in a devolatilizing twin-screw extruder.

U.S. Pat. No. 5,324,806 describes forming a free flowing silicone powder having a primary particle size in the range of 0.1-200 nm and an aggregate size of 10 nm to 200 microns by spray drying an organic solvent dispersion of a MQ resin. U.S. Pat. No. 5,319,040 describes capping such MQ resin by reaction with an organosilicon nitrogen material, for example a silazane, before spray drying. Either type of spray dried MQ resin can be used to make heat curable organopolysiloxane compositions, such as a pressure sensitive adhesive. U.S. Pat. No. 5,357,007 describes mixing spray dried MQ resin with a fluid network mixture of an alkenyl siloxane, a silicon hydride siloxane and a hydrosilylation catalyst to form a pressure sensitive adhesive.

U.S. Pat. No. 8,017,712 describes producing a solid solventless MQ resin by feeding a MQ resin dispersed in a volatile solvent into an extruder, removing the volatile solvent and recovering the extruded solid solventless MQ resin.

A volatile compound is a compound which is easily evaporated at room temperature (20-25° C.). A volatile compound has a high vapor pressure at ordinary room temperature. A volatile compound has a low boiling point, typically less than or equal to 250° C. measured at a standard atmospheric pressure.

DETAILED DESCRIPTION OF THE INVENTION

A process according to the present invention for the production of a pressure sensitive adhesive comprises dissolving a particulate solid MQ silicone resin having a bulk density in the range 0.4-0.9 g/cm$^3$ in a volatile solvent, and dissolving a polydiorganosiloxane having a viscosity of 0.1 to 40,000 Pa·s at 25° C. in the volatile solvent before, simultaneously with or after dissolving the solid MQ silicone resin.

The particulate solid MQ silicone resin having a bulk density in the range 0.4-0.9 g/cm$^3$ can be produced by the process described in U.S. Pat. No. 8,017,712, which is hereby incorporated by reference. Thus the process of the invention according to one aspect includes the initial step of producing the particulate solid MQ silicone resin having a bulk density in the range 0.4-0.9 g/cm$^3$ by feeding at least one MQ silicone resin dispersed in a volatile solvent into an extruder, removing the volatile solvent in the extruder to form a solid solventless MQ silicone resin, extruding the solid solventless MQ silicone resin, and comminuting the extruded solid solventless MQ silicone resin.

The extruder is generally a devolatilizing extruder capable of heating the MQ silicone resin, removing volatiles under reduced pressure and moving highly viscous molten materials and solid materials through the process steps. Examples of useful extruders include single screw or twin screw extruders. Typically a twin-screw extruder is used. The conditions of extrusion are for example as described in U.S. Pat. No. 8,017,712.

The solid solventless MQ silicone resin produced by the above process is generally friable when cooled to ambient temperature and can readily be comminuted under any type of strain to form flakes. Cooling may be augmented by passing the extruded densified stream through a water bath or spray. The solid solventless MQ silicone resin can be extruded onto an ice chilled drum to rapidly cool and flake the resin. The solid solventless MQ silicone resin can alternatively be comminuted into chunks or pellets upon exiting the extrusion device.

The MQ silicone resin can in general be any polymer comprised primarily of $R_3SiO_{1/2}$ and $SiO_{4/2}$ units. The MQ silicone resin may optionally contain up to 20 mole % $R_2SiO_{2/2}$ and/or $RSiO_{3/2}$ units wherein each R is a functional or non-functional, substituted or unsubstituted monovalent radical. The MQ silicone resin can for example be of the general formula $R^1{}_n(R^2O)_bSiO_{(4-n-b/2)}$, where each $R^1$ is monovalent and independently selected from hydrogen, alkyl, alkenyl, oximo, aryl, carbinol, anhydride, epoxy, carboxyl, ether, polyether, amide, and alkyl amino groups, which $R^1$ groups may be the same or different, with the proviso that at least 60 mole percent of $R^1$ groups are methyl, each $R^2$ is hydrogen or a monovalent alkyl group having 1 to 4 carbon atoms, n has an average value from 1.1 to 1.6, and b is such that group ($R^2O$) is 0 to 10 weight percent of the MQ resin.

The MQ silicone resin can for example have a number average molecular weight (Mn) of at least 1,000 or 1,500 up to 20,000 or 30,000. Often the MQ silicone resin has Mn between 1,500 and 7,500, alternatively between 2,000 and 5,000.

The MQ silicone resin can contain functional groups, which may be chosen to be reactive with functional groups in the polydiorganosiloxane. Thus for use with a hydroxyl-terminated polydiorganosiloxane having Si—OH functional groups, the MQ silicone resin can contain silicon-bonded hydroxyl or alkoxy groups. For example the MQ silicone resin can have the general formula $R^1{}_n(R^2O)_bSiO_{(4-n-b/2)}$, where $R^1$, $R^2$ and n are defined as above and b is such that group ($R^2O$) is 1 to 10 weight percent of the MQ resin.

For use with an alkenyl-functional polydiorganosiloxane, the MQ silicone resin can contain silicon-bonded alkenyl groups such as for example vinyl groups. Such a MQ silicone resin may also contain $R^2O$ groups or may be a capped resin containing no silicon-bonded hydroxyl or alkoxy groups.

MQ resins are usually produced in dispersion in an aromatic hydrocarbon solvent such as toluene or xylene. Thus in the initial step of producing the particulate solid MQ silicone resin having a bulk density in the range 0.4-0.9 g/cm³ by feeding at least one MQ silicone resin dispersed in a volatile solvent into an extruder, the volatile solvent in which the MQ silicone resin is dispersed is usually an aromatic hydrocarbon.

In some instances, it may be preferred to avoid pressure sensitive adhesives compositions containing aromatic hydrocarbon solvents for different reasons for example for regulatory reasons.

In some embodiments, the volatile solvent used in the present invention is substantially free of one or more of xylene, toluene, ethyl benzene because of toxicity concerns associated to these compounds. In some embodiments, volatile solvent used in the present invention is substantially free of aromatic hydrocarbon solvent.

The volatile solvent into which the particulate solid MQ silicone resin is dissolved can for example be an aliphatic hydrocarbon, a volatile silicone solvent, an ester, a ketone, an ether or even an aromatic hydrocarbon.

Examples of suitable aliphatic hydrocarbons include linear, branched or cyclic aliphatic hydrocarbons having 6 to 16 carbon atoms, for example saturated acyclic aliphatic hydrocarbons (paraffins) such as heptane, hexane, octane, isooctane, decane, isodecane, isohexadecane or dodecane or isododecane and cyclic aliphatic hydrocarbons such as cyclohexane, methylcyclohexane or decahydronaphthalene. The aliphatic hydrocarbon solvent can be an alkene, for example heptene, cyclohexadiene, cyclohexene, or 2,5-dimethyl-2,4-hexadiene. Mixtures of aliphatic hydrocarbons are also suitable, for example the mixture of branched paraffins sold under the trade mark ISOPAR®.

In some embodiments, the volatile solvent is heptane or a volatile silicone solvent. Heptane is preferred.

Examples of suitable volatile silicone solvents include linear, branched and cyclic polydiorganosiloxanes, for example polydimethylsiloxanes such as linear trimethylsilyl-terminated polydimethylsiloxanes having a viscosity of 0.65 to 5 mPa·s at 25° C., and cyclic polydimethylsiloxanes such as decamethylcyclopentasiloxane and octamethylcyclotetrasiloxane. Volatile silicone solvents can contain organic groups other than methyl, for example higher alkyl groups or phenyl groups. An example is 3-octyl heptamethyl trisiloxane.

Examples of suitable ester solvents are carboxylate esters such as alkyl carboxylate esters and carbonate esters such as alkyl carbonate esters. For example the volatile solvent can comprise at least one $C_{1-8}$ alkyl ester of a $C_{2-4}$ carboxylic acid such as ethyl acetate or butyl acetate. Examples of suitable carbonate ester solvents include diethyl carbonate and dicaprylyl carbonate.

Examples of suitable ketone solvents include methyl isobutyl ketone (4-methyl-2-pentanone), 2-pentanone, 3-hexanone and methyl isoamyl ketone (5-methyl-2-hexanone).

Examples of suitable ether solvents include dibutyl ether, volatile polyethers such as 1-(propoxymethoxy)propane and cyclic ethers such as cyclopentamethyl ether.

Examples of volatile aromatic hydrocarbons into which the particulate solid MQ silicone resin is dissolved include toluene, xylene and benzene. For example the MQ silicone resin may have been prepared in a technical grade of xylene containing a low level of ethylbenzene. For most uses this is acceptable, but for some uses such as medical pressure sensitive adhesives it may be advantageous to re-dissolve the MQ silicone resin in toluene. Alternatively the MQ silicone resin may have been prepared in toluene but xylene may be preferred as the pressure sensitive adhesive solvent because of its higher flash point. The polydiorganosiloxane which is dissolved in the volatile solvent when producing the pressure sensitive adhesive is a liquid polydiorganosiloxane having a viscosity of 0.1 to 40,000 Pa·s at 25° C. The polydiorganosiloxane is dissolved in the volatile solvent before, simultaneously with or after dissolving the solid MQ silicone resin. Conveniently, for example the solid MQ silicone resin is dissolved in the volatile solvent and the polydiorganosiloxane is dissolved in the resulting solution. The weight ratio of MQ silicone resin to polydiorganosiloxane can for example be in the range 0.5:1 to 4:1.

The polydiorganosiloxane can contain groups reactive with functional groups present in the MQ silicone resin. For example, the polydiorganosiloxane can contain silicon-bonded hydroxyl groups which are reactive with silicon-bonded hydroxyl or alkoxy groups in the MQ silicone resin. The polydiorganosiloxane can for example be a hydroxyl-terminated polydiorganosiloxane.

A catalyst for reaction of the functional groups of the polydiorganosiloxane with functional groups present in the MQ silicone resin, and/or a cross-linking agent for reacting together the polydiorganosiloxane and the MQ silicone resin, can be dissolved in the volatile solvent before, simultaneously with or after dissolving the solid MQ silicone resin and before, simultaneously with or after dissolving the polydiorganosiloxane. For example, if the polydiorganosiloxane contains silicon-bonded hydroxyl groups and the MQ silicone resin contains silicon-bonded hydroxyl or alkoxy groups, a catalyst for siloxane condensation of the polydiorganosiloxane and the MQ silicone resin can be dissolved in the volatile solvent when producing the pressure sensitive adhesive.

The condensation catalyst can for example be an acid catalyst or a base catalyst. Acid catalysts include carboxylic acids such as acetic acid, benzoic acid, propanoic acid, butanoic acid, formic acid and metal salts of carboxylic acids wherein the metal is selected from the group consisting of Li, Na, K, Ce, and Ca, for example potassium formate or potassium acetate.

A base catalyst can for example be selected from alkali metal oxides, alkali metal alkoxides, alkali metal hydroxides, alkali metal silanolates, alkali metal siloxanolates, alkali metal amides, alkyl metals, ammonia, amines, and ammonia compounds such as ammonium hydroxide and substituted ammonium hydroxides. Alkali metal oxides are exemplified by sodium oxide. Alkali metal alkoxides are exemplified by potassium ethoxide, sodium methoxide, lithium methoxide, and potassium isopropoxide. Alkali metal hydroxides are exemplified by potassium hydroxide, lithium hydroxide, sodium hydroxide, and cesium hydroxide. Alkali metal silanolates are exemplified by potassium silanolate, lithium silanolate, and sodium silanolate. Alkali metal siloxanolates are exemplified by potassium siloxanolate, lithium siloxanolate, and sodium siloxanolate. Alkali metal amides are exemplified by sodium amide and potassium amide. Alkyl metals are exemplified by butyllithium. Amines are exemplified by triethylamine. Substituted ammonium hydroxides are exemplified by quaternary ammonium hydroxides such as tetramethyl ammonium hydroxide. The base catalyst can alternatively be a quaternary phosphonium hydroxide exemplified by tetrabutyl phosphonium hydroxide. The base catalyst can alternatively be a salt of a strong base and weak acid such as potassium carbonate.

A simple form of pressure sensitive adhesive comprises the MQ silicone resin, the polydiorganosiloxane, and preferably a condensation catalyst, all dissolved in the volatile solvent. The pressure sensitive adhesive becomes tacky when exposed or applied to a substrate so that the volatile solvent is able to evaporate. Alternatively a polydiorganosiloxane containing silicon-bonded hydroxyl groups and a MQ silicone resin containing silicon-bonded hydroxyl or alkoxy groups, and preferably a condensation catalyst, can be reacted when dissolved in the volatile solvent to produce a 'bodied' pressure sensitive adhesive. The solution of the MQ silicone resin, the polydiorganosiloxane and a condensation catalyst can for example be heated at a temperature in the range 50° C. to 200° C.

The polydiorganosiloxane can alternatively be an alkenyl-functional polydiorganosiloxane containing silicon-bonded alkenyl groups for example vinyl or hexenyl groups. The polydiorganosiloxane can contain alkenyl terminal groups, for example a dimethylvinylsilyl-terminated polydimethylsiloxane, and/or pendant Si-bonded alkenyl groups. For example, the polydiorganosiloxane can contain trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, vinyldimethylsiloxy-terminated polydimethylsiloxane-polymethyhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, vinyldimethylsiloxy terminated poly(dimethylsiloxane-monomethylsilsesquioxane) polymers, vinyldimethylsiloxy terminated poly(dimethylsiloxane-vinylmethylsiloxane-methylsilsesquioxane) copolymers; trimethylsiloxy terminated poly(dimethylsiloxane-vinylmethylsiloxane-methylsilsesquioxane) polymers, hexenyldimethylsiloxy terminated poly(dimethylsiloxane-monomethylsilsesquioxane) polymers, hexenyldimethylsiloxy terminated poly(dimethylsiloxane-hexenylmethylsiloxane-methylsilsesquioxane) copolymers; trimethylsiloxy terminated poly(dimethylsiloxane-hexenylmethylsiloxane-methylsilsesquioxane) polymers, vinyldimethylsiloxy terminated poly(dimethylsiloxane-silicate) copolymers, hexenyldimethylsiloxy-terminated poly(dimethylsiloxane-silicate) copolymers, trimethylsiloxy terminated poly(dimethylsiloxane-vinylmethylsiloxane-silicate) copolymers and trimethylsiloxy terminated poly(dimethylsiloxane-hexenylmethylsiloxane-silicate) copolymers, vinylsiloxy or hexenylsiloxy terminated poly(dimethylsiloxane-hydrocarbyl copolymers), mixed trimethylsiloxy-vinyldimethylsiloxy terminated poly(dimethylsiloxane-silicate copolymers), mixed trimethylsiloxy-hexenyldimethylsiloxy terminated poly(dimethylsiloxane-silicate copolymers), mixed trimethylsiloxy-vinyldimethylsiloxy terminated poly(dimethylsiloxane-vinylmethylsiloxane-silicate) copolymers and mixed trimethylsiloxy-hexenyldimethylsiloxy terminated poly(dimethylsiloxane-hexenylmethylsiloxane-silicate) copolymers. vinylsiloxy terminated or hexenylsiloxy terminated poly(dimethylsiloxane-polyoxyalkylene) block copolymers, alkenyloxydimethylsiloxy terminated polyisobutylene and alkenyloxydimethylsiloxy terminated polydimethylsiloxane-polyisobutylene block copolymers.

A pressure sensitive adhesive composition comprising an alkenyl-functional polydiorganosiloxane often contains a cross-linking agent containing Si—H groups, for example a Si—H functional polysiloxane. The Si—H functional polysiloxane can be exemplified by dimethylhydrogensiloxy-terminated polydimethylsiloxane polymers, di methyl hydrogensiloxy-terminated polymethylhydrogensiloxane polymers, di methyl hydrogensiloxy-terminated polydimethylsiloxane-polymethylhydrogensiloxane copolymers, trimethylsiloxy-terminated polydimethylsiloxane-polymethylhydrogensiloxane copolymers, or trimethylsiloxy-terminated polymethylhydrogensiloxane polymers, each having a degree of polymerization of from 5 to 100 and a viscosity at 25° C. of from 5 to 100 milliPascal-seconds.

A pressure sensitive adhesive composition comprising an alkenyl-functional polydiorganosiloxane usually contains a hydrosilylation catalyst such as a platinum group metal-containing catalyst. By platinum group it is meant ruthenium, rhodium, palladium, osmium, iridium and platinum and complexes thereof. Platinum group metal-containing catalysts useful in preparing the compositions of the present invention are the platinum complexes prepared as described by Willing, U.S. Pat. No. 3,419,593, and Brown et al, U.S. Pat. No. 5,175,325, each of which is hereby incorporated by reference to show such complexes and their preparation. Other examples of useful platinum group metal-containing catalysts can be found in Lee et al., U.S. Pat. No. 3,989,668;

Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalysts and methods for their preparation. The platinum-containing catalyst can be platinum metal, platinum metal deposited on a carrier such as silica gel or powdered charcoal, or a compound or complex of a platinum group metal. Preferred platinum-containing catalysts include chloroplatinic acid, either in hexahydrate form or anhydrous form, and or a platinum-containing catalyst which is obtained by a method comprising reacting chloroplatinic acid or platinum dichloride with an aliphatically unsaturated organosilicon compound such as divinyltetramethyldisiloxane, or alkene-platinum-silyl complexes as described in U.S. Pat. No. 6,605,734, which is hereby incorporated by reference. The platinum catalyst can for example be present in an amount sufficient to provide 2 parts per million (ppm) to 200 ppm of platinum in the pressure sensitive adhesive composition.

A pressure sensitive adhesive composition comprising an alkenyl-functional polydiorganosiloxane may also comprise an inhibitor that inhibits the catalytic activity of platinum group metal-containing catalysts at room temperature but does not interfere with the properties of the catalyst at elevated temperatures. Examples of suitable inhibitors include ethylenically or aromatically unsaturated amides, acetylenic compounds, silylated acetylenic compounds, ethylenically unsaturated isocyanates, olefinic siloxanes, unsaturated hydrocarbon monoesters and diesters, conjugated ene-ynes, hydroperoxides, nitriles, and diaziridines. Inhibitors are exemplified by 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, and ((1,1-dimethyl-2-propynyl)oxy) trimethylsilane, unsaturated carboxylic esters exemplified by diallyl maleate, dimethyl maleate, diethyl fumarate, diallyl fumarate, and bis-2-methoxy-1-methylethylmaleate, mono-octylmaleate, mono-isooctylmaleate, mono-allyl maleate, mono-methyl maleate, mono-ethyl fumarate, mono-allyl fumarate, and 2-methoxy-1-methylethylmaleate; conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, and vinylcyclosiloxanes such as 1,3,5,7-tetramethyl-1,3,5,7-tetravinylcyclotetrasiloxane. Generally when inhibitor is present to the composition, it will be present in amounts from 0.05 to 1 weight percent of the pressure sensitive adhesive composition.

The Si—H functional polysiloxane crosslinking agent and the hydrosilylation catalyst, and the inhibitor if used, are dissolved in the volatile solvent before, simultaneously with or after dissolving the solid MQ silicone resin and before, simultaneously with or after dissolving the polydiorganosiloxane.

The MQ silicone resin for use in a pressure sensitive adhesive composition comprising an alkenyl-functional polydiorganosiloxane may contain alkenyl groups so that the MQ silicone resin becomes bonded to the polydiorganosiloxane through the Si—H functional polysiloxane crosslinking agent upon curing, or may not contain alkenyl groups.

The volatile solvent is preferably chosen to be unreactive under the conditions used to prepare the pressure sensitive adhesive. When producing a 'bodied' pressure sensitive adhesive, the volatile solvent is preferably chosen to be unreactive under the conditions of the condensation reaction. We have found that ester solvents such as ethyl acetate may undergo some hydrolysis when using a base catalyst under the silicone condensation conditions described above. Unsaturated hydrocarbon solvents may be avoided when the pressure sensitive adhesive includes a Si—H functional polysiloxane crosslinking agent and a hydrosilylation catalyst. Preferably the volatile solvent used in the present invention is substantially free of ester solvent for example free of ethyl acetate.

A portion of the polydiorganosiloxane can be added to the MQ silicone resin in the extruder, so that the particulate solid MQ silicone resin produced by comminuting the extruded solid solventless MQ silicone resin contains a minor proportion of polydiorganosiloxane. We have found that capped MQ silicone resins containing no silicon-bonded hydroxyl or alkoxy groups, particularly capped MQ silicone resins of molecular weight Mn 20,000 or above, are difficult to process in an extruder. Addition of a small proportion of polydiorganosiloxane makes such capped MQ silicone resins more readily extrudable without adversely affecting removal of solvent from the MQ silicone resin in the extruder. If polydiorganosiloxane is added to the MQ silicone resin in the extruder, the weight ratio of MQ silicone resin to polydiorganosiloxane in the extruder, and hence the weight ratio of MQ silicone resin to polydiorganosiloxane in the particulate solid MQ silicone resin, is preferably at least 5:1, for example in the range 5:1 to 50:1.

MQ silicone resins containing silicon-bonded hydroxyl or alkoxy groups, even of molecular weight Mn 20,000 or more, can readily be extruded as a solid MQ silicone resin without needing addition of polydiorganosiloxane.

The process of the invention is usually carried out batch wise. The process can alternatively be carried out in a continuous processing mode using equipment such as a twin screw extruder in a continuous flow through process. The particulate solid MQ silicone resin is fed to the extruder using appropriate equipment for feeding solids. The other components of the pressure sensitive adhesive (e.g. polydiorganosiloxane, new solvent, and catalyst, and any other additives) are fed subsequently to the extruder. The extruder for the process of this invention should be capable of removing the small amount of water generated from any reaction between the MQ resin and the polydiorganosiloxane.

The particulate solid MQ silicone resins having a bulk density in the range 0.4-0.9 g/cm$^3$ produced in an extruder have advantages when producing pressure sensitive adhesives, compared to use of the spray dried MQ silicone resins described in prior patents. The spray dried MQ silicone resins are very low density, dusty powders which can form explosive mixtures in air. This makes them more difficult to handle and increases the hazards associated with handling them.

An additional benefit of the process of the present invention is that the process of effectively stripping out the solvent from the MQ silicone resin in the extruder also removes some of the lowest molecular weight components of the MQ resins, for example the neopentamer $((CH_3)_3SiO)_4Si$. These lowest molecular weight, most volatile fractions of the MQ silicone resins may vaporize from the pressure sensitive adhesive during cure and then tend to accumulate in ovens and coating equipment as sticky deposits and dust. Using the process of the present invention the quantity of these undesirable resin fractions is reduced and therefore the tendency to create deposits in the ovens of users of the pressure sensitive adhesives during coating and curing is reduced.

The pressure sensitive adhesive compositions produced according to the invention can contain minor amounts of additives. For example the composition may contain a stabiliser. The stabiliser may be a silyl phosphate such as a monosilyl phosphate, a disilyl phosphate, or a trisilyl phosphate or a rare earth metal salt of a fatty acid. Examples of silyl phosphates include trimethylsilyl dihydrogen phosphate, bis(trimethylsilyl)hydrogen phosphate, tris(trimethylsilyl)phosphate, or a combination thereof. Examples of suitable silyl phosphates are disclosed in U.S. Pat. No. 5,041,586, which is hereby incorporated by reference. Examples of rare earth metals suitable for forming the fatty acid salt include, cerium, lanthanum and praseodymium with cerium being typical. The fatty acid generally contains 6 to 18 carbon atoms with 8 carbon atoms such as 2-ethyl-hexanoic acid being typical. The typical salt is cerium octoate. The amount of stabiliser may range from 0 to 1000 parts per million by weight of the pressure sensitive adhesive composition, typically 10 to 300 parts per million.

The silicone pressure sensitive adhesives prepared by the method of this invention will readily stick to support a solid support or substrate, whether flexible or rigid. These pressure sensitive adhesive compositions may be applied to a surface by any suitable means such as rolling, spreading or spraying. The surface of the support and the substrate to which the support is adhered may be any known solid material such as metals, paper, wood, leather, fabrics, organic polymeric materials, painted surfaces, siliceous materials such as concrete, bricks, cinderblocks, and glass including glass cloth. After applying it to the surface, the adhesive may be cured by air drying or heating for example at temperatures of up to 300° C.

Useful articles which can be prepared with the silicone pressure sensitive adhesives of this invention include pressure sensitive tapes, labels, emblems and other decorative or informational signs.

EXAMPLES

The invention is illustrated by the following Examples, in which parts and percentages are by weight.

Comparative Example C1

To a 1 liter, three-neck flask, equipped with a stirrer and condenser with Dean-Stark water trap, 325.9 gm of a MQ silicone resin of empirical formula $M_{0.95}Q$ or $(CH3)_n(HO)_bSiO_{(4-n-b/2)}$, where n=1.46, Mn=2350, and OH content is 2.5% as delivered in xylene (71.8% resin in xylene) was added followed by 148.2 gm of xylene. With stirring 126.0 gm of hydroxyl-endblocked polydimethylsiloxane fluid having a viscosity of about 55 Pa·s and Mn 52,910 was added to the flask. A tube was lowered below the liquid level and ammonia was bubbled into the mixture while stirring continued. The flask was heated to 115° C. and held for two hours with the ammonia bubbling and stirring continuing. After two hours, 1.1 ml of water was observed in the trap. The ammonia was stopped and the flask was heated to 135° C. Nitrogen was bubbled through the mixture and the mixture was tested with pH paper until it showed a neutral pH. The resulting pressure sensitive adhesive was cooled and poured out of the flask.

Example 1

This Example describes dissolving in xylene a solventless solid MQ silicone resin prepared from a xylene solution of the MQ resin.

A solventless solid MQ silicone resin was prepared from the MQ silicone resin in xylene solution described in the Comparative Example using the conditions described in Example 1 of U.S. Pat. No. 8,017,712. To a ½ gallon jar, 980.06 gm of solid MQ resin was added followed by 420.51 gm of xylene. The jar was mixed and the MQ resin was allowed to dissolve.

To a 1 liter, three-neck flask, equipped with a stirrer and condenser with Dean-Stark water trap, 335.5 gm of the solution prepared above was added followed by 138.7 gm of xylene. With stirring 126.0 gm of a hydroxyl-endblocked polydimethylsiloxane exhibiting a viscosity of approximately 50,000 mPa·s at 25° C. was added to the flask. A tube was lowered below the liquid level and ammonia was bubbled into the mixture while stirring continued. The flask was heated to 115° C. and held for two hours with the ammonia bubbling and stirring continuing. After two hours, 2.0 ml of water was observed in the trap. The ammonia was stopped and the flask was heated to 135° C. Nitrogen was bubbled through the mixture and the mixture was tested with pH paper until it showed a neutral pH. The resulting pressure sensitive adhesive was cooled and poured out of the flask.

Example 2

To a ½ gallon jar, 297.62 gm of the solid MQ resin described in Example 1 was added followed by 198.45 gm of heptane. The jar was mixed and the MQ resin was allowed to dissolve.

To a 1 liter, three-neck flask, equipped with a stirrer and condenser with Dean-Stark water trap, 389.8 gm of the solution prepared above was added followed by 84.5 gm of heptane. With stirring 126.0 gm of a hydroxyl-endblocked polydimethylsiloxane exhibiting a viscosity of approximately 50,000 mPa·s at 25° C. was added to the flask. A tube was lowered below the liquid level and ammonia was bubbled into the mixture while stirring continued. The flask was heated to 90° C. and held for two hours with the ammonia bubbling and stirring continuing. After two hours, 1.0 ml water was observed in the trap. The ammonia was stopped and the flask was heated to 92° C. Nitrogen was bubbled through the mixture and the mixture was tested with pH paper until it showed a neutral pH. The resulting pressure sensitive adhesive was cooled and poured out of the flask.

Test results from Examples 1 and 2 and the Comparative Example are shown in Table 1. The viscosity of each pressure sensitive adhesive, adjusted to 60% solids, was measured at 25° C.

The samples for testing were prepared as follows: Pressure sensitive adhesive laminates were prepared by casting the solvated adhesives onto 2-mil (50 µm) thick polyester (PET) films using a vacuum coating table with an appropriate application bar to yield a 1.0-mil (25 µm) dry pressure sensitive adhesive thickness. The vacuum plate was turned on and set to 15" of vacuum. The substrate to be coated was placed on the plate and the vacuum held it firmly in place. The application bar was placed at the top of the substrate and a puddle of adhesive was poured in front of the bar. The bar was pulled down the substrate at a constant speed and pressure. The laminate was placed in an air-circulating oven and dried at 110° C. for 6 minutes to remove all solvent. Once dried, the laminate was allowed to cool to ambient temperature and placed in a sample box to protect from contamination prior to testing.

Each prepared laminate was cut into test strips using a 1 inch (25 mm) specimen tape cutter. A cutting board was placed under the laminate and the cutter was run in the same direction as the application bar. Each laminate provided 4 test strips.

Laminate thickness was measured using a DIGIT-MIKE® plus micrometer. The micrometer was zeroed by initially measuring the thickness of two pieces of test substrate. A piece of the pressure sensitive adhesive laminate was cut with the specimen cutter and covered with a second piece of test substrate. Measurements were taken in at least three places on the new laminate where adhesive was present to ensure the desired pressure sensitive adhesive thickness was obtained throughout the sample.

The peel adhesion (180°) was tested according to ASTM D3330 and PSTC-1 standards. All tests were conducted on an Instron tensile tester at a peel rate of 12 inches (300 mm) per minute with 2.0 mil (50 μm) PET as the test substrate. A 1 inch wide sample strip of PSA was adhered to a clean stainless steel panel using a 2 kg roller with 2 passes. Samples were allowed 20 minutes to equilibrate at room temperature before performing the tests. The average of 3 measurements was typically reported.

The static shear strength was measured according to ASTM D3654 and PSTC-7 standards. Samples were prepared for testing by placing a 1-inch wide strip of PSA onto a clean stainless steel test panel. The samples were cut to provide a 1 inch by 1 inch area of contact and secured with 2 passes of a 2 kg roller. Metal hangers were secured from the bottom of each test strip and reinforced to ensure that failure of the sample occurred at the testing interface. Each test sample was placed in the ChemInstruments HT-8 Shear Bank testing apparatus and the timer was reset to zero. A 4 pound (1.8 kg) weight was hung from each sample and the time to failure was recorded as the sample fell off the panel. The average of 3 measurements was typically reported.

The TA-Total Area and TA-Area Ratio were measured as follows:

Testing with the Texture Analyzer TA.XT2 sold by Texture Technologies Corp. was completed using a 7 mm, stainless steel punch probe with a 1-inch radius of curvature. Using 10-mil PET as the testing substrate, samples were placed under an indexable brass plate to position them for analysis. The following program settings were used:
Pre-test speed: 0.5 mm/sec
Test speed: 0.2 mm/sec
Post-test speed: 0.2 mm/sec
Test force: 100 grams
Dwell time: 0.5 seconds
Trigger force: 1.0 gram
Trigger mode: Auto
Collection rate: 200 points/second A software macro was run after the completion of each sample to calculate the Peak Force, Area 1:2, Area 2:3, Total Area, and Area Ratio based on three points on the graph. Point 1 is where the actual graph begins to cross over the x-axis into a positive force region. Point 2 is where the graph reaches its maximum force. Point 3 is where the graph returns to the x-axis. Area 1:2 is the area under the curve from points 1 to 2, Area 2:3 is the area under the curve from points 2 to 3, the Total Area is the area under the curve from points 1 to 3, and the Area Ratio is calculated by dividing Area 2:3 by Area 1:2. The average of 5 measurements was typically reported. The Total Area is a measure of the amount of work required to pull a probe free from the adhesive, and the Area Ratio corresponds to the tackiness of the adhesive.

TABLE 1

| | Control (C1) | Example 1 | Example 2 |
|---|---|---|---|
| Resin | Control | Solid | Solid |
| Solvent | Xylene | Xylene | Heptane |
| Viscosity @ 60% (cP) | 708 | 753 | 726 |
| Peel Adhesion (N/10 mm) | 9.94 | 10.14 | 8.3 |
| Static Shear (hours) | 171.2 | 163.7 | 163.6 |
| TA - Total Area (g · sec) | 30.3 | 30.43 | 19.44 |
| TA - Area Ratio | 0.2 | 0.15 | 0.15 |

The test results in Table 1 show that the control C1 and Example 1 prepared from the solid MQ resin dissolved in xylene provided very similar results, indicating that producing the MQ silicone resin in particulate solid form and re-dissolving it did not deleteriously affect the pressure sensitive adhesive. Example 2 prepared from the solid MQ resin dissolved in heptane also provided similar results and produced an acceptable pressure sensitive adhesive.

Example 3

To a 2 liter, three-neck flask, equipped with a stirrer and condenser with Dean-Stark water trap, 493.71 gm of xylene was added. With stirring, 372.88 gm of the solid MQ resin described in Example 1 was added. With continued stirring, 309.21 gm of hydroxyl-endblocked polydimethylsiloxane gum exhibiting a Mn of approximately 300,000 Daltons was added in small pieces and 1.24 gm of silyl phosphate was added. The mixture was stirred overnight to assure the silicone fluid was fully dissolved. A mixture of 2.4017 gm benzoic acid and 21.5992 gm of xylene was added. The entire mixture was heated to the refluxing temperature of the xylene (approximately 140° C.) and held for 2.5 hours. The flask was cooled and the resulting pressure sensitive adhesive was found to exhibit 58.62% non-volatile content and viscosity of 31,800 mPa·s.

Samples for testing were prepared by the following procedure. Weigh out at least 25 grams of adhesive. Using a freshly prepared solution of 10% benzoyl peroxide (Lucidol 98) in Toluene, add 2% (based on adhesive solids) benzoyl peroxide to the adhesive. Dilute to 50+/−0.5% with toluene and mix for at least one minute. Apply adhesive to a sheet of 1 mil (25 μm) thick Mylar PET with an automated coater so the final thickness after curing is 1.5-2.0 mils (37-50 μm). Cure the adhesive for 2 minutes at 70° C. and then 2 minutes at 178° C. Cut three 1 inch strips of adhesive and apply each to a clean steel panel at a rate of 12 inches/minute with automated roll down instrument or using a 4.5 pound (2 kg) Hand Roller.

For adhesion testing, pull the strip from the steel in a direction parallel with the steel plate. Measure the force of the pull and record in ounces per inch. Report the average of the three pulls of adhesive from the steel.

For tack, use an instrument equivalent to a POLYKEN™ Probe Tack Tester—Model PT-1000—ChemInstruments, Inc. Place 5 annular rings in a row on a 1 inch strip on film prepared as described above for adhesion. Separate the rings from each other by cutting the film between them. Place the annular ring on the three set screws on the test platform. Press the START toggle button for two seconds and release it to start the test sequence. The test platform will lower until the probe contacts the tape for one second and then rise back to the starting position. The tack value will be displayed. Report the Maximum Force in grams.

The adhesion was 32.1 oz/in (365 g/cm) and the tack was 813 g as measured by the methods described above, which were typical values for a pressure sensitive adhesive prepared using the xylene solution from which the solid MQ resin was prepared.

Example 4

To a 500 ml three-neck flask, equipped with a stirrer and condenser with Dean-Stark water trap, 129.21 g toluene was added. The Dean-Stark trap was filled with toluene and a slow nitrogen purge was used in the three neck flask. A total of 89.93 gm of the solid MQ Resin described in Example 1 was added with 0.37 gm of a solution of 10% silyl phosphate in toluene. The stirrer was turned on at 200 RPM. Small balls of the silicone gum described in Example 3 were added until a total of 79.98 gm had been added. The stirring continued for approximately 2 hours and 45 minutes and then was shut off over night. The next morning the stirrer was turned on again and the flask was heated to the reflux temperature of the toluene. It was held at reflux for 1 hour and 42 minutes and then the reflux stopped for 25 minutes. The reflux was restarted and continued for 1 hour and 56 minutes. The flask was allowed to cool and the resulting pressure sensitive adhesive was poured out. The adhesion and tack were measured as described in Example 3 with the following differences. The adhesive was coated on 2 mil (50 μm)PET using 3 mil (75 μm) bird bar, and curing was at 80° C. for 2 minutes and then 180° C. for 2 minutes. The pressure sensitive adhesive exhibited values of Adhesion=47.9 oz/in (544 g/cm) and Tack=856 g.

Example 5

To a 500 ml three-neck flask, equipped with a stirrer and condenser with Dean-Stark water trap, 129.23 gm of toluene was added. The Dean-Stark trap was filled with toluene and a slow nitrogen purge was used in the three neck flask. A total of 93.50 gm of the solid MQ Resin described in Example 1 was added with 0.37 gm of a solution of 10% silyl phosphate in toluene. The stirrer was turned on at 200 RPM. Small balls of the silicone gum described in Example 3 were added until a total of 76.39 gm had been added. The stirring continued for approximately 2 hours and 15 minutes and then was shut off over night. The next morning the stirrer was turned on again and the flask was heated to the reflux temperature of the toluene. It was held at reflux for 4 hours. The flask was allowed to cool and the resulting pressure sensitive adhesive was poured out. The adhesion and tack were measured as described in Example 4 The pressure sensitive adhesive exhibited values of Adhesion=51.9 oz/in (590 g/cm) and Tack=897 g.

Example 6

In preparation for the run, 46.8 kg of the solid MQ Resin described in Example 1 was added to a 55 gallon drum, then 62.5 kg of toluene was added to the drum and this mixture was drum tumbled for 6 hours. The kettle was cleaned by boiling toluene and at the end of the last boil-up of toluene the trap was left full of toluene so that the kettle could be refluxed without changing the toluene concentration in the kettle.

The 109.3 kg of MQ resin dissolved in toluene was added to a 50 gallon glass lined kettle, equipped with an agitator, water trap, and recycle loop. After loading, the agitator was started and set to 200 rpm. While stirring, 35.3 kg of the silicone gum described in Example 3 was loaded into the kettle via the hand hole. The gum was cut into smaller pieces using a gum knife while loading. 17.40 grams of a mixture of Bis(Trimethylsilyl) Hydrogen Phosphate, Trimethylsilyl Dihydrogen Phosphate, and Tris(Trimethylsilyl)Phosphate was added to a glass bottle. To that glass bottle, 156.62 grams of toluene was added. The mixture was shaken and then added to the kettle via the hand hole. A nitrogen purge was kept on the kettle throughout the entire raw material loading process. The mixture in the kettle was allowed to mix for 2 hours while agitating at 200 rpm.

After blending, 253.89 grams of benzoic acid USP grade was loaded into the kettle via the catalyst adder. The catalyst adder was rinsed with 876 grams of toluene to make sure all of the benzoic acid reached the kettle contents. The kettle was then heated to the refluxing temperature of the toluene (approximately 111° C.) and held for 4 hours. A small amount of water was collected in the trap. The kettle contents were cooled to 50° C., and then filtered through a 50 micron filter bag. The resulting pressure sensitive adhesive was found to exhibit 56.22% non-volatile content and a viscosity of 45,800 mPa·s.

The adhesion and tack were measured as described in Example 4. The adhesion was 51 oz/in (580 g/cm) and the tack was 689 g which are typical values for a bodied pressure sensitive adhesive produced from the same raw materials using a silicone MQ resin as prepared in xylene.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

The invention claimed is:

1. A process for the production of a pressure sensitive adhesive, the process comprising:
    feeding at least one MQ silicone resin dispersed in a volatile solvent into an extruder;
    removing the volatile solvent in the extruder to form a solid solventless MQ silicone resin;
    extruding the solid solventless MQ silicone resin;
    comminuting the extruded solid solventless MQ silicone resin to produce a particulate solid MQ silicone resin having a bulk density in the range of 0.4 to 0.9 g/cm$^3$;
    dissolving the particulate solid MQ silicone resin in a volatile solvent; and
    dissolving a polydiorganosiloxane having a viscosity of from 0.1 to 40,000 Pa·s at 25° C. in the volatile solvent before, simultaneously with or after dissolving the particulate solid MQ silicone resin in the volatile solvent.

2. The process according to claim 1, wherein the MQ silicone resin has the general formula $R^1{}_n(R^2O)_b SiO_{(4-n-b/2)}$, where each $R^1$ is monovalent and independently selected from hydrogen, alkyl, alkenyl, oximo, aryl, carbinol, anhydride, epoxy, carboxyl, ether, polyether, amide, and alkyl amino groups, which $R^1$ groups may be the same or different, with the proviso that at least 60 mole percent of $R^1$ groups are methyl, each $R^2$ is hydrogen or a monovalent alkyl group having 1 to 4 carbon atoms, n has an average value from 1.1 to 1.6, and b is such that group ($R^2O$) is 0 to 10 weight percent of the MQ silicone resin.

3. The process according to claim 1, wherein the MQ silicone resin has a number average molecular weight (Mn) between 1,500 and 30,000.

4. The process according to claim 1, wherein the volatile solvent into which the particulate solid MQ silicone resin and polydiorganosiloxane are dissolved comprises at least one aliphatic hydrocarbon having 6 to 16 carbon atoms.

5. The process according to claim 1, wherein the volatile solvent into which the particulate solid MQ silicone resin and polydiorganosiloxane are dissolved comprises at least one volatile silicone solvent selected from trimethylsilyl-terminated polydimethylsiloxanes having a viscosity of from 0.65 to 5 mPa·s at 25° C., cyclic polydimethylsiloxanes, and 3-octyl heptamethyl trisiloxane.

6. The process according to claim 1, wherein the volatile solvent into which the particulate solid MQ silicone resin and polydiorganosiloxane are dissolved comprises toluene or xylene.

7. The process according to claim 1, wherein the volatile solvent into which the particulate solid MQ silicone resin and polydiorganosiloxane are dissolved comprises at least one $C_{1-8}$ alkyl ester of a $C_{2-4}$ carboxylic acid.

8. The process according to claim 1, wherein the polydiorganosiloxane contains groups reactive with groups present in the MQ silicone resin.

9. The process according to claim 8, wherein the polydiorganosiloxane is a hydroxyl-terminated polydiorganosiloxane and the MQ silicone resin has the general formula $R^1{}_n(R^2O)_b SiO_{(4-n-b/2)}$, where each $R^1$ is monovalent and independently selected from hydrogen, alkyl, alkenyl, oximo, aryl, carbinol, anhydride, epoxy, carboxyl, ether, polyether, amide, and alkyl amino groups, which $R^1$ groups may be the same or different, with the proviso that at least 60 mole percent of $R^1$ groups are methyl, each $R^2$ is hydrogen or a monovalent alkyl group having 1 to 4 carbon atoms, n has an average value from 1.1 to 1.6, and b is such that group ($R^2O$) is 1 to 10 weight percent of the MQ silicone resin.

10. The process according to claim 9, wherein a catalyst for condensation of the polydiorganosiloxane and the MQ silicone resin is dissolved in the volatile solvent before, simultaneously with or after dissolving the solid MQ silicone resin.

11. The process according to claim 10, wherein the catalyst is selected from carboxylic acids and metal salts of carboxylic acids.

12. The process according to claim 10, wherein the catalyst is a base selected from alkali metal oxides, alkali metal alkoxides, alkali metal hydroxides, alkali metal silanolates, alkali metal siloxanolates, alkali metal amides, alkyl metals, ammonia, amines and ammonium hydroxide.

13. The process according to claim 10, further comprising heating the solution of the MQ silicone resin, the polydiorganosiloxane and the catalyst for condensation of the polydiorganosiloxane and the MQ silicone resin at a temperature in the range of 50° C. to 200° C.

14. The process according to claim 8, wherein the polydiorganosiloxane is an alkenyl-functional polydiorganosiloxane, and a Si-H functional polysiloxane crosslinking agent and a hydrosilylation catalyst are dissolved in the volatile solvent before, simultaneously with or after dissolving the solid MQ silicone resin.

15. The process according to claim 1, wherein the weight ratio of the solid MQ silicone resin to polydiorganosiloxane is in the range of 0.5:1 to 4:1.

16. The process according to claim 1, wherein a portion of the polydiorganosiloxane is added to the MQ silicone resin in the extruder, so that the particulate solid MQ silicone resin produced by comminuting the extruded solid solventless MQ silicone resin contains a minor proportion of the polydiorganosiloxane.

17. The process according to claim 16, wherein the weight ratio of the MQ silicone resin to polydiorganosiloxane in the particulate solid MQ silicone resin is in the range of 5:1 to 50:1.

* * * * *